June 7, 1960  M. J. CARPINELLA  2,939,194
PRONG RING FASTENER MEMBER
Filed Aug. 21, 1958
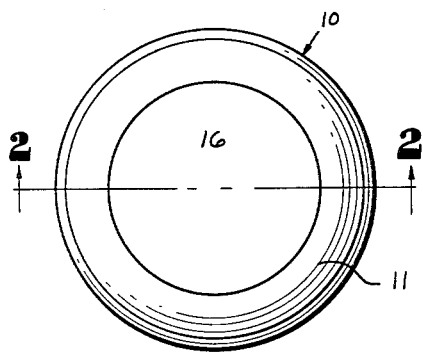
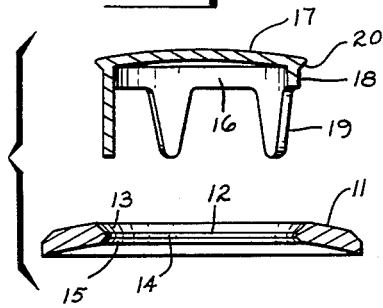
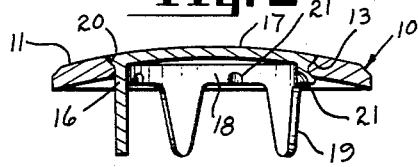
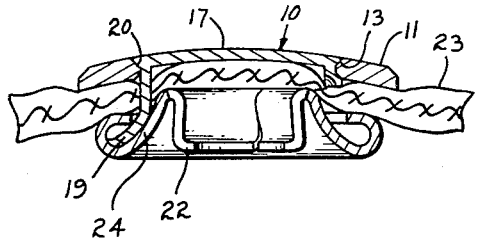
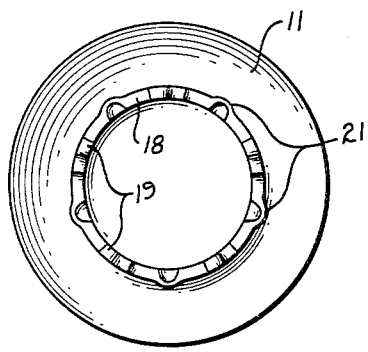
INVENTOR
Michael J. Carpinella
BY
ATTORNEY United States Patent Office 2,939,194
Patented June 7, 1960

2,939,194
PRONG RING FASTENER MEMBER

Michael J. Carpinella, Waterbury, Conn., assignor to Scovill Manufacturing Company, Waterbury, Conn., a corporation of Connecticut Filed Aug. 21, 1958, Ser. No. 756,396

3 Claims. (Cl. 24—216)

This invention relates generally to snap fasteners and particularly to an improved pronged attaching member for securing a socket member to articles of clothing or the like.

This invention is a continuation-in-part of my prior application, Serial No. 599,196, filed July 20, 1956, and now abandoned.

Prong rings in the past have been made with center openings. These center openings have been objectionable when the prong rings were used to attach fastener members to the cuffs or fronts of high grade shirts and similar garments. When such prong rings were used, the garment material would be forced upwardly through said openings into a plane higher than the surrounding material thus subjecting this elevated portion of the fabric to a greater amount of surface wear and tear and consequently, quickly soiling and wearing out that exposed portion of the garment. Prior attempts to solve this problem, as by molding a central insert in the ring, have been too expensive and otherwise objectionable. According to my invention, this problem is solved by providing a central cupped insert member having prongs integral therewith and an annular member or flange ring secured to the cupped member.

The principal object of this invention is to make the two-piece pronged member in such a manner that the two pieces are held together by the shaping of the members themselves and in such a way that the top surfaces of the interfitted members will be substantially flush with each other.

Another object is to provide such a prong ring with a continuous top surface which shall be thinner in the central portion between the prongs than in the outer ring portion, to provide ample room for the flexible support material between that prong member and fastener part so as to prevent a build-up of pressure on the interposed material such as would tend to separate the fastener parts and also allow a better anchorage for the prongs in the anvil section of the fastener part.

In the drawing:

Fig. 1 is a plan view of a pronged attaching member embodying my invention;

Fig. 2 is a cross sectional view taken along the line 2—2 of Fig. 1;

Fig. 3 is a bottom plan view of the attaching member;

Fig. 4 is a sectional view through the flange ring and center insert member as they appear before assembly; and Fig. 5 is a sectional view of the attaching member as it appears attached to a socket member through a support.

Referring now to the drawing, the numeral 10 designates generally a pronged attaching member consisting of an annular flange ring 11 which may be readily constructed from sheet material and preferably formed with an upwardly curving top surface. The ring 11 has a central opening 12 shaped to provide an upwardly and outwardly tapering conical wall 13, an intermediate short cylindrical wall 14 and a downwardly facing conical wall 15 of a smaller area than the upper wall 13.

The member for closing the opening 12 in the ring 11 consists of an inverted cup-shaped central insert 16 having a top section 17 with an outwardly curved top surface, a depending wall 18 and a series of tapered prongs 19 projecting from the lower edge of said wall 18 and equally spaced thereabout. The top section 17 of the insert 16 is formed on an arc comparable to the arc on the flange ring 11 and terminates in a conical rim 20 providing a beveled undersurface.

When the insert 16 is assembled into the flange ring 11, the prongs 19 and depending wall 18 will first be slipped through the cylindrical wall 14 and to a position where the beveled undersurface of the conical rim 20 will be seated against the upper tapering conical wall 13 of the ring 11, in which position the curved top surface of section 17 of the insert 16 will be flush with the upper surface of said ring.

When the ring 11 and insert 16 are thus assembled, portions of the depending wall 18 may be forced outwardly to provide a series of nibs 21 between the prongs bearing against the underside of the ring 11 in opposed relation to the beveled undersurface of the rim 20. Thus the nibs 21 in conjunction with the conical rim 20 fitting against the upper conical wall of the ring serve to permanently attach the insert member to the ring as a unit before it is used to attach a fastener part to a support member.

Fig. 5 shows the prong attaching member 10 as it appears when attached to a conventional socket 22 wherein the prongs 19 are pierced through a piece of interposed support material 23 and then formed outwardly and clinched in the anvil section 24 of said socket. It will be noted from this assembly that the curved top section 17 of the insert 16 is considerably thinner than the thickness of the flange rim and thus affords more room for the support material 23 to be forced upwardly into the hollow of the insert member in its assembled state and allows the prongs 19 of said insert member to obtain a firmer grip in the socket anvil 24.

Minor changes in details of the construction and arrangements of parts may be made without departing from the scope of the present invention as set forth in the appended claims.

What is claimed:

1. A two-piece pronged member for attaching fastener elements to a support comprising an annular ring having an opening in its center with an upwardly and outwardly tapering conical sidewall, a cup-shaped central insert fitted into said center opening having a top surface flush with the top surface of said ring and having a series of prongs projecting from the open end thereof, said insert having a conical rim seated against the conical sidewall of said opening, and portions of said insert between the prongs extended under and against the underside of said ring in opposed relationship to said conical rim to provide means for permanently holding said insert in said ring.

2. A two-piece pronged member for attaching fastener elements to a support comprising an annular ring with an outwardly and downwardly curving top surface having an opening in its center with an upwardly and outwardly tapering conical sidewall, a closure insert fitted into said opening, said insert having a top section with an outwardly curving upper surface flush with the top surface of said ring, a depending cylindrical wall and a series of prongs depending from the free edge of said wall, the outer circumference of said top section outwardly of said cylindrical wall having a beveled undersurface seated against said conical sidewall, and portions of said cylindrical wall between said prongs extended outwardly and bearing against the underside of said ring in opposed relation to said beveled undersurface to provide means for permanently securing said insert to said ring.

3. A two-piece pronged member according to claim 2 wherein the top section of the insert member is substantially thinner than the annular ring for the purpose described.

References Cited in the file of this patent

UNITED STATES PATENTS

| | | |
|---|---|---|
| 287,969 | Smith | Nov. 6, 1883 |
| 754,125 | Capewell | Mar. 8, 1904 |
| 834,035 | Washburne | Oct. 23, 1906 |
| 1,164,460 | Bradley | Dec. 14, 1915 |
| 2,701,400 | Sönderby | Feb. 8, 1955 |